(12) United States Patent
Moribe

(10) Patent No.: US 11,679,599 B2
(45) Date of Patent: Jun. 20, 2023

(54) IMAGE PROCESSING APPARATUS AND CONTROL METHOD THEREOF GENERATING QUANTIZED BASED ON MULTINARY COLOR DATA AND A THRESHOLD MATRIX

(71) Applicant: CANON KABUSHIKI KAISHA, Tokyo (JP)

(72) Inventor: Shoei Moribe, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/527,358

(22) Filed: Nov. 16, 2021

(65) Prior Publication Data
US 2022/0176710 A1    Jun. 9, 2022

(30) Foreign Application Priority Data
Dec. 8, 2020  (JP) .............................. JP2020-203653

(51) Int. Cl.
*B41J 2/21* (2006.01)
*H04N 1/04* (2006.01)
*H04N 1/00* (2006.01)

(52) U.S. Cl.
CPC ........ *B41J 2/2146* (2013.01); *H04N 1/00037* (2013.01); *H04N 1/00082* (2013.01); *H04N 1/0408* (2013.01)

(58) Field of Classification Search
CPC ........ H04N 1/6038; H04N 1/605; H04N 1/54; H04N 1/0408; H04N 1/56; H04N 1/60; H04N 1/6005; H04N 1/6008; H04N 1/00082; H04N 1/00037; B41J 2/2146

USPC ......................................................... 358/515
See application file for complete search history.

(56) References Cited

U.S. PATENT DOCUMENTS

| | | | |
|---|---|---|---|
| 5,111,310 A | 5/1992 | Parker | |
| 6,867,884 B1* | 3/2005 | Rozzi | H04N 1/52 358/1.9 |
| 10,769,506 B2 | 9/2020 | Doi et al. | |
| 10,771,657 B2 | 9/2020 | Doi et al. | |
| 11,003,965 B2 | 5/2021 | Moribe et al. | |
| 2005/0002048 A1* | 1/2005 | Takahashi | H04N 1/52 358/1.9 |
| 2013/0120769 A1* | 5/2013 | Kakutani | G06K 15/10 358/1.8 |

(Continued)

FOREIGN PATENT DOCUMENTS

JP     2017-38127 A     2/2017

*Primary Examiner* — Chad Dickerson
(74) *Attorney, Agent, or Firm* — Venable LLP

(57) ABSTRACT

An image processing apparatus operable to generate data for printing an image onto a printing medium using a plurality of color materials. The apparatus generates a plurality of color image data corresponding to the plurality of color materials based on image data; generates multinary color data corresponding to a combination of the plurality of color materials based on the plurality of color image data; and generates quantized data corresponding to each of the plurality of color materials based on the multinary color data and a threshold matrix. The apparatus generates the quantized data such that a color difference between a generated color in a case where a shift in a relative printing position does not occur and a generated color in a case where a shift in a relative printing position occurs is small.

7 Claims, 12 Drawing Sheets

(56) References Cited

U.S. PATENT DOCUMENTS

2019/0052775 A1* 2/2019 Suzuki .................... H04N 1/52
2020/0324555 A1 10/2020 Moribe et al.
2020/0324557 A1 10/2020 Moribe et al.

* cited by examiner

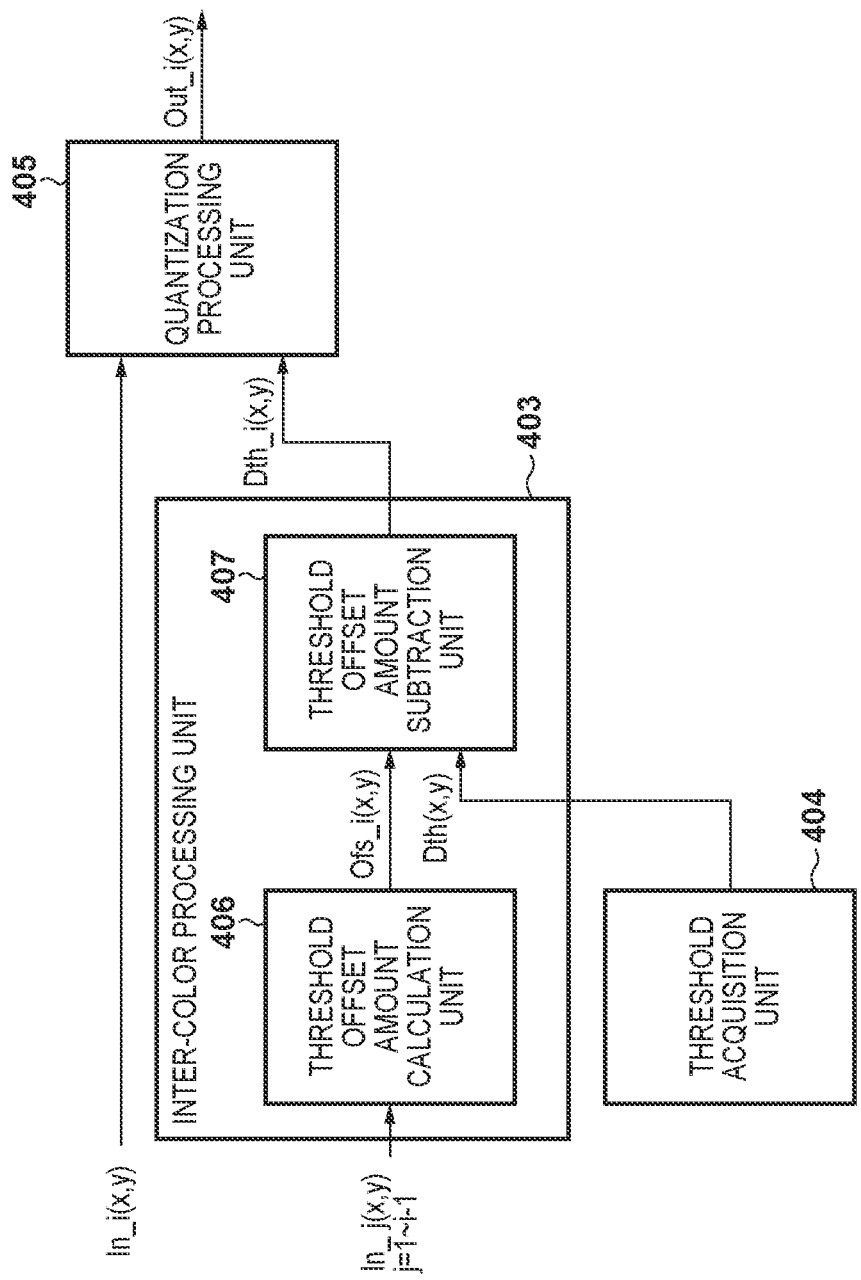

|   | COLOR ELEMENTS | NUMBER OF ELEMENTS |
|---|---|---|
| 0 | W | 1 TYPE |
| 1 | C,M,Y,K | 4 TYPES |
| 2 | CM,CY,CK,MY,MK,YK | 6 TYPES |
| 3 | CMY,CMK,CYK,MYK | 4 TYPES |
| 4 | CMYK | 1 TYPE |

FIG. 9

C,M,Y,K=30840, 28270, 20560, 0 (16bit)

| | W | Y | M | C | MY | CY | CM | CMY | K | YK | MK | CK | MYK | CYK | CMK | CMYK |
|---|---|---|---|---|---|---|---|---|---|---|---|---|---|---|---|---|
| 901 | 0 | 6426 | 28270 | 16706 | 0 | 14134 | 0 | 0 | 0 | 0 | 0 | 0 | 0 | 0 | 0 | 0 |
| 902 | 10768 | 4790 | 12906 | 15439 | 6232 | 6270 | 5864 | 3267 | 0 | 0 | 0 | 0 | 0 | 0 | 0 | 0 |

FIG. 10

C,M,Y,K=30840, 28270, 20560, 0 (16bit)

| | W | Y | M | C | MY | CY | CM | CMY | K | YK | MK | CK | MYK | CYK | CMK | CMYK |
|---|---|---|---|---|---|---|---|---|---|---|---|---|---|---|---|---|
| 1001 | 13540 | 6189 | 10271 | 12035 | 4695 | 5502 | 9130 | 4174 | 0 | 0 | 0 | 0 | 0 | 0 | 0 | 0 |
| 1002 | 14371 | 6135 | 9676 | 11232 | 4513 | 5528 | 9697 | 4384 | 0 | 0 | 0 | 0 | 0 | 0 | 0 | 0 |

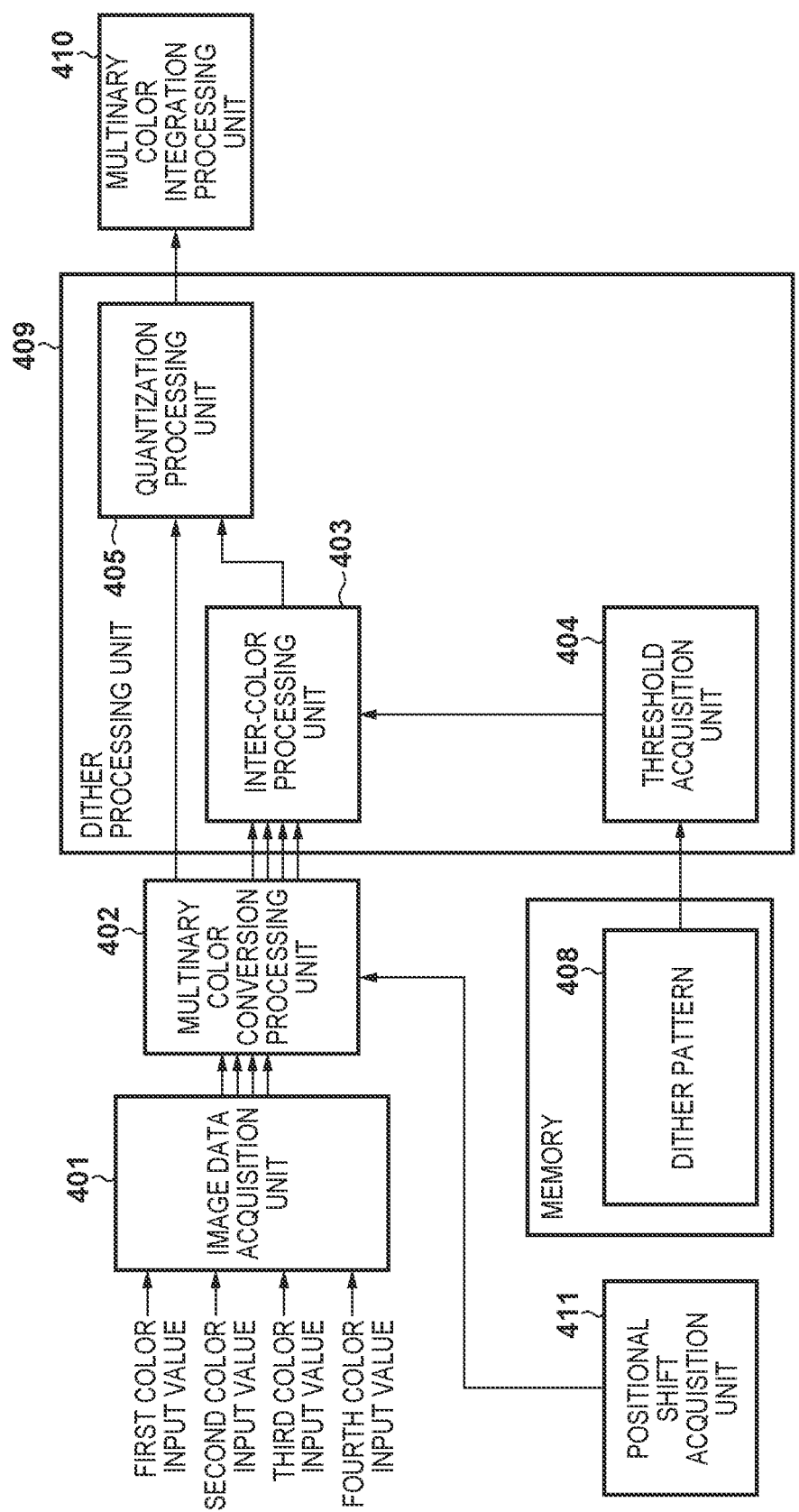

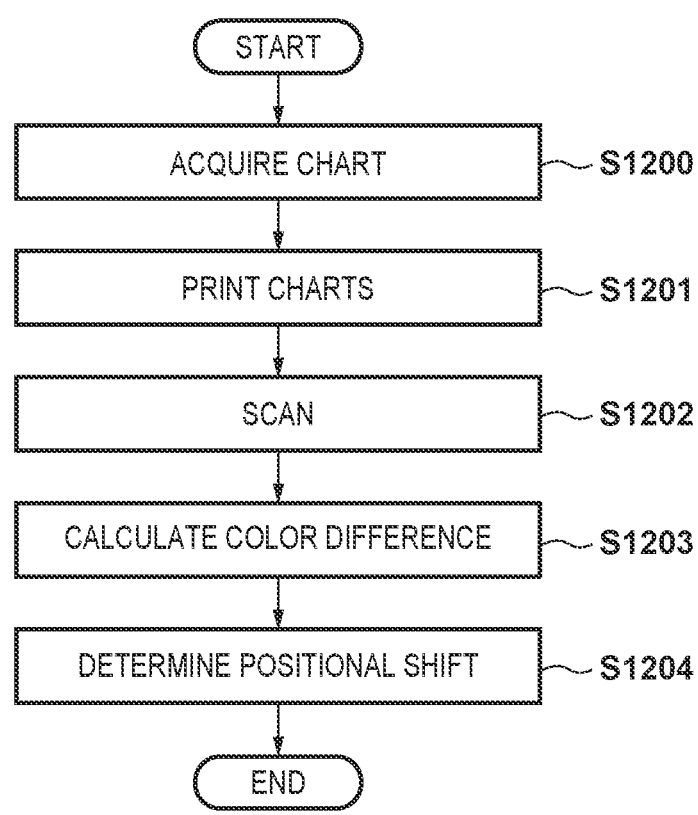

IMAGE PROCESSING APPARATUS AND CONTROL METHOD THEREOF GENERATING QUANTIZED BASED ON MULTINARY COLOR DATA AND A THRESHOLD MATRIX

BACKGROUND OF THE INVENTION

Field of the Invention

The present invention relates to quantization processing for image data.

Description of the Related Art

It is necessary to quantize multi-valued image data when printing images using pseudo-halftoning. An error diffusion method and a dither method are known as quantization methods utilized at this time. The dither method of determining to print or not print dots by comparing pre-stored thresholds with halftone values of multi-valued data has a smaller processing load than the error diffusion method and is used in many image processing apparatuses.

Incidentally, in the dither method, a problem to be solved is dispersibility of dots for making the graininess of images less conspicuous. U.S. Pat. No. 5,111,310 (Patent Document 1) proposes a method of utilizing a threshold matrix having blue noise characteristics as a threshold matrix for obtaining suitable dot dispersibility. In addition, U.S. Pat. No. 6,867,884 (Patent Document 2) discloses a dither method suitable for when printing an image with a plurality of color materials (i.e., mixed colors). Specifically, quantization processing (hereinafter referred to as inter-color processing) is performed while shifting thresholds of a plurality of colors between each other. Further, Japanese Patent Laid-Open No. 2017-38127 (Patent Document 3) discloses inter-color processing focusing on the likelihood that graininess will be perceived.

However, in the quantization based on inter-color processing such as that disclosed in Patent Document 2 and Patent Document 3, graininess is improved but an adverse effect on image quality called color fluctuation would sometimes occur. Here, color fluctuation refers to a change in color caused by a change in how dots overlap due to a shift in dot landing position when an image is printed with a plurality of color materials (mixed colors).

Since a dot pattern of each color material is uncorrelated in the case of normal quantization, the ratio of dots of each color material overlapping does not change, and so color fluctuation is small even if a shift in dot landing position occurs. Meanwhile, when the above inter-color processing is performed, dots do not overlap when there is no positional shift and the dots overlap when there is a positional shift, and so color fluctuation due to the presence or absence of positional shift relatively increases.

SUMMARY OF THE INVENTION

According to one aspect of the present invention, an image processing apparatus operable to generate data for printing an image onto a printing medium using a plurality of color materials, the apparatus comprises: a color separation unit configured to generate a plurality of color image data corresponding to the plurality of color materials based on image data; a generation unit configured to generate multinary color data corresponding to a combination of the plurality of color materials based on the plurality of color image data; and a quantization unit configured to generate quantized data corresponding to each of the plurality of color materials based on the multinary color data and a threshold matrix, wherein the quantization unit generates the quantized data such that a color difference between a generated color in a case where a shift in a relative printing position between the plurality of color materials does not occur and a generated color in a case where a shift in a relative printing position between the plurality of color materials occurs is small.

The present invention enables more suitable processing of quantizing image data.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B are a flow and flowchart of data in inter-color processing.

FIG. 6 is a diagram illustrating an example of multinary color data.

FIG. 9 is a diagram illustrating an example of a result of inter-color processing in a conventional technique.

FIG. 10 is a diagram illustrating an example of a result of inter-color processing in a first embodiment.

FIG. 11 is a block diagram illustrating a flow of data in quantization processing.

FIG. 12 is a flowchart illustrating processing of acquiring a positional shift.

DESCRIPTION OF THE EMBODIMENTS

Figure 1A:
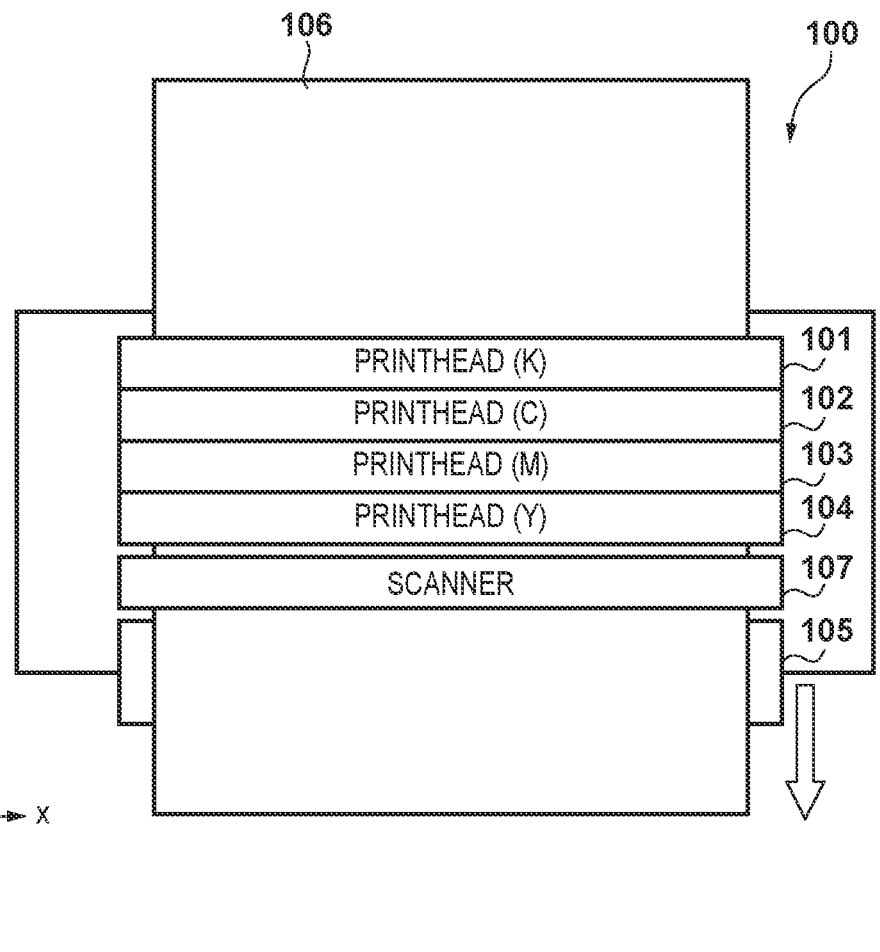
FIGS. 1A and 1B are diagrams schematically illustrating a structure of an inkjet printer.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

As a first embodiment of an image processing apparatus according to the present invention, description will be given below using an inkjet printer as an example. In particular, a mode of improving graininess while suppressing the above-described color fluctuation in a full-line inkjet printer using a long head in which a plurality of printhead modules are connected will be described.

In full-line inkjet printers, when the conveyance of a printing medium is meandering, the phase of meandering differs for each printhead module, causing a periodic color fluctuation. The reason why the phases of meandering differ is because the timing of printing (the timing of ejection of ink) onto the printing medium differs due to a plurality of printhead modules being attached at staggered positions in the sheet conveyance direction (FIG. 1B).

However, the present invention is applicable not only to full-line printing apparatuses but also to, for example, so-called serial printing apparatuses in which printing is performed by scanning a printhead in a direction intersecting a conveyance direction of a printing sheet.

<Apparatus Configuration>

Figure 1B:
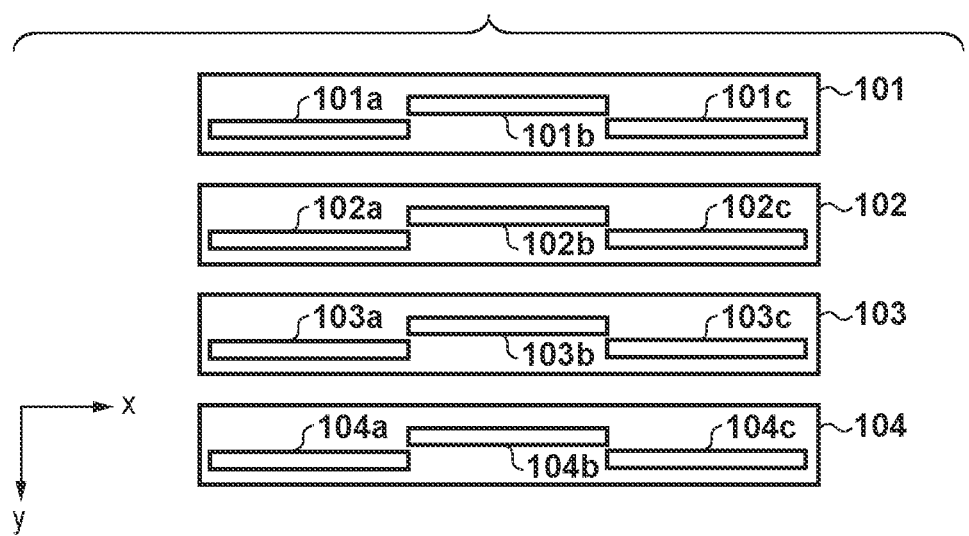

FIG. 1A is a diagram schematically illustrating a structure of an inkjet printer. A printer 100 indicates a structure of a so-called full-line inkjet printer. The printer 100 includes printheads 101 to 104 on a frame constituting a structural material of the printer. The printheads 101 to 104 are printheads for ejecting black (K), cyan (C), magenta (M), and yellow (Y) inks, respectively. In each printhead, a plurality of nozzles for ejecting ink are arranged along a predetermined direction (x direction) over a range corresponding to the width of a printing sheet 106. Here, the resolution of the nozzle arrangement of rows of nozzles for each ink color is 1200 dpi.

A scanner 107 in which reading elements are arranged at a predetermined pitch is disposed at a position downstream of the printheads 101 to 104. The scanner 107 can read images printed by the printheads 101 to 104 and output these as multi-valued RGB data. Note that a method for using the scanner 107 will be described in the later-described second embodiment.

FIG. 1B is a diagram schematically illustrating a plurality of head modules constituting the printheads. Each of the printheads 101 to 104 is configured by combining a plurality of head modules. For example, in the printhead 101, the head modules 101a, 101b, and 101c are disposed, staggered with respect to the paper conveyance direction.

The printing sheet 106 serving as a printing medium is conveyed in an arrow direction (y direction) by a conveyance roller 105 (and other rollers (not illustrated)) rotated by the driving force of a motor (not shown). Then, while the printing sheet 106 is being conveyed, ink is ejected from the plurality of nozzles of each of the printheads 101 to 104 in accordance with print data. As a result, an image of one raster line corresponding to a row of nozzles of the respective printheads is sequentially printed onto the surface of the printing sheet 106. By repeating such an ink ejection operation, an image of one page can be printed onto the surface of the printing sheet 106, for example.

<System Configuration>

Figure 2:
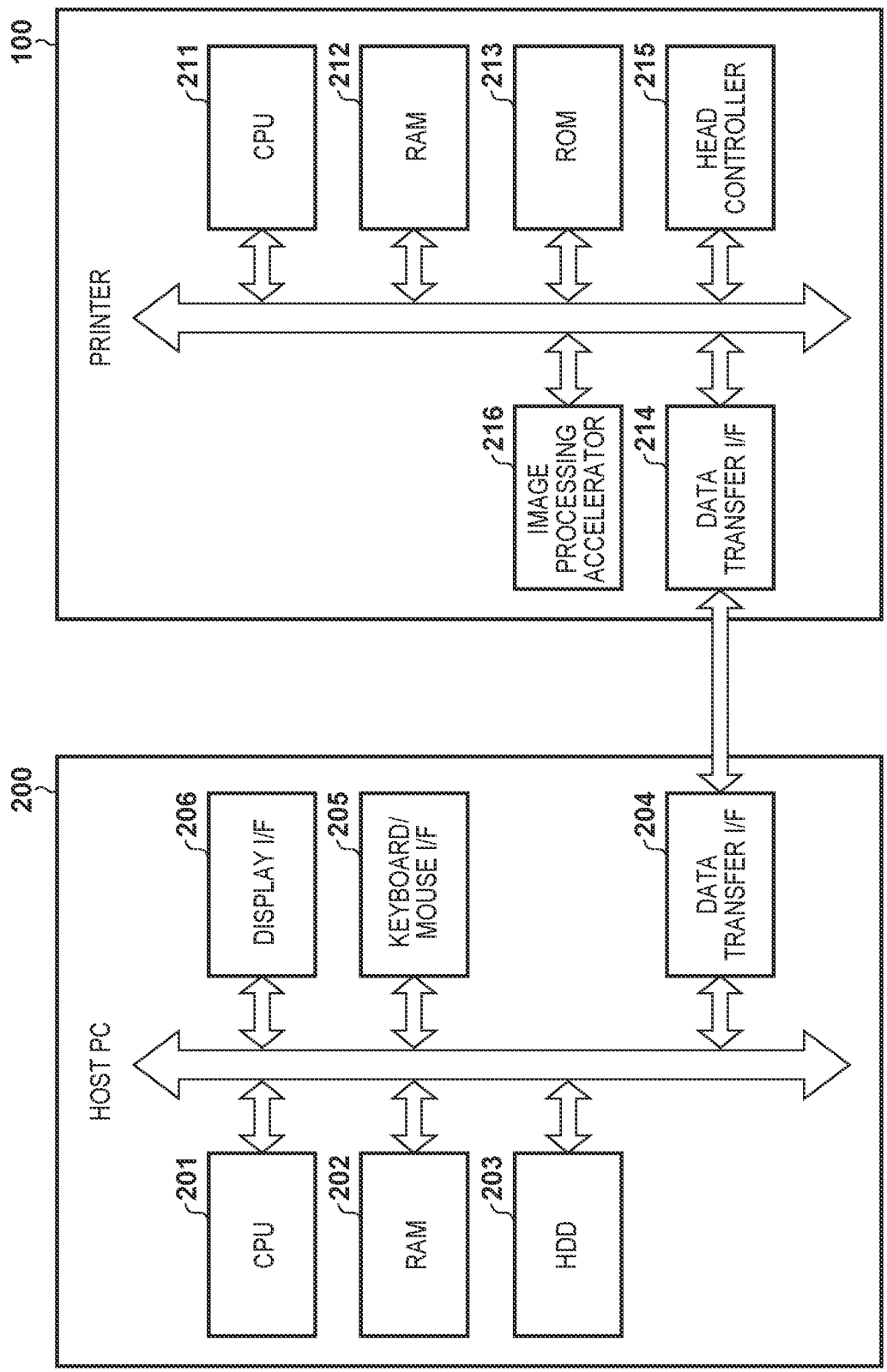
FIG. 2 is a block diagram illustrating a hardware configuration of a printing system.

FIG. 2 is a block diagram illustrating a hardware configuration of a printing system. The printing system includes the printer 100 illustrated in FIG. 1A and a host PC 200 (a personal computer (PC) serving as a host apparatus).

The host PC 200 includes a CPU 201, a RAM 202, an HDD 203, a data transfer I/F (interface) 204, a keyboard/mouse I/F 205, and a display I/F 206.

The CPU 201 executes processes in accordance with programs held in the HDD 203 or the RAM 202 serving as a storage unit. The RAM 202 is a volatile storage unit and temporarily holds programs and data. The HDD 203 is a non-volatile storage unit and similarly holds programs and data. The data transfer I/F (interface) 204 controls the transmission and reception of data to and from the printer 100. A USB, IEEE 1394, LAN, and the like can be used for connection of the data transfer I/F 204.

The keyboard/mouse I/F 205 is an interface for controlling HIDs (Human Interface Devices), such as a keyboard and a mouse, and the user can perform input via the interface. The display I/F 206 controls display outputs to a display (not illustrated).

The printer 100 includes a CPU 211, a RAM 212, a ROM 213, a data transfer I/F 214, a head controller 215, and an image processing accelerator 216.

The CPU 211 executes processes in accordance with programs held in the ROM 213 or the RAM 212. The RAM 212 is a volatile storage unit and temporarily holds programs and data. The ROM 213 is a non-volatile storage unit and can hold programs and data. The data transfer I/F 214 controls the transmission and reception of data to and from the PC 200.

The head controller 215 supplies print data to the respective rows of nozzles of the printheads 101 to 104 illustrated in FIGS. 1A and 1B and controls a printhead ejection operation. Specifically, the head controller 215 reads control parameters and print data from predetermined addresses of the RAM 212. Then, the CPU 211 writes control parameters and print data to the predetermined addresses of the RAM 212. Accordingly, the head controller 215 starts processing and performs ink ejection from the printheads.

The image processing accelerator 216 is hardware capable of performing image processing faster than the CPU 211. Specifically, the image processing accelerator 216 reads parameters and data necessary for the image processing from predetermined addresses of the RAM 212. Then, by the CPU 211 writing parameters and data to the predetermined addresses of the RAM 212, the image processing accelerator 216 is started, and predetermined image processing is performed on the above data. Note that the image processing accelerator 216 is not an essential element, and the image processing may be executed only by software processing by the CPU 211 in accordance with the specification or the like of the printer.

<System Operation>

Figure 3:
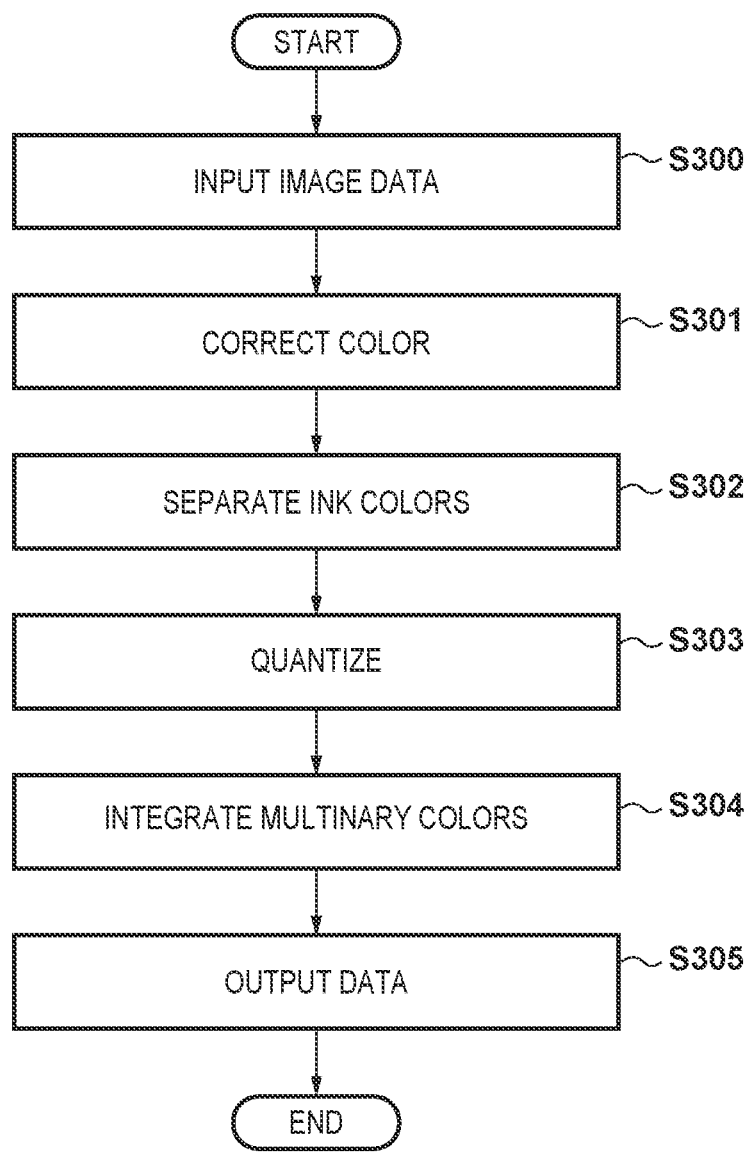
FIG. 3 is a flowchart illustrating image processing.

FIG. 3 is a flowchart illustrating the image processing. The present image processing is achieved by the CPU 201 provided in the host PC 200 and/or the CPU 211 provided in the printer 100 executing programs. Note that in the following explanation, it is assumed that the process of steps S300 to S302 is performed by the host PC 200 and the process of steps S303 to S305 is performed by the printer 100. However, which process is performed by the host PC 200 and which process is performed by the printer 100 can be appropriately designated by the designer and is not fixed.

For example, if the host PC 200 is to perform up to quantization (step S303), configuration may be taken so as to transfer the quantized data to the printer 100. Further, depending on the performance of the printer 100, it may also be possible to directly receive multi-valued RGB image data and perform the process in steps S301 to S305 in the printer 100.

In step S300 (image data input processing), the CPU 201 inputs image data from the RAM 202. The image data is, for example, 8-bit luminance data of each of R (red), G (green), and B (blue) colors in a standardized color space such as sRGB.

In step S301 (color correction processing), the CPU 201 performs color correction on the inputted image data. Here, the inputted image data is converted to 12-bit luminance data of each of RGB colors corresponding to a color space unique to the printer. As a method for converting signal values, a known method such as referring to a look-up table (LUT) stored in advance in an HDD or the like can be adopted.

In step S302 (ink color separation processing), the CPU 201 separates RGB data obtained by the color correction processing into color image data (density data) corresponding to the ink colors of the printing apparatus. Here, 16-bit density data of each of C (cyan), M (magenta), Y (yellow), and K (black) colors, which are ink colors, are generated. That is, at this stage, a 16-bit image is generated for 4 channels (4 colors). Similarly to the color correction processing (step S301), this ink color separation processing can be realized by referring to a look-up table (LUT) stored in advance in a ROM or the like. The CMYK data obtained by the ink color separation processing is transmitted to the printer 100 via the data transfer I/F 214.

In step S303 (quantization processing), the CPU 211 performs quantization processing on the CMYK data inputted from the host PC 200. At this time, the inputted 16-bit density data of the four channels is quantized after being converted into multinary color data by a multinary color conversion processing unit 402, which will be described later.

Here, the multinary color data is data from a nullary color to quaternary colors when the number of inks is four types, CMYK. For example, primary colors indicate colors where C, M, Y, K inks are printed individually (without overlap), and tertiary colors indicate colors which are three kinds of ink printed in a superimposed manner.

Figures 5B, 6:
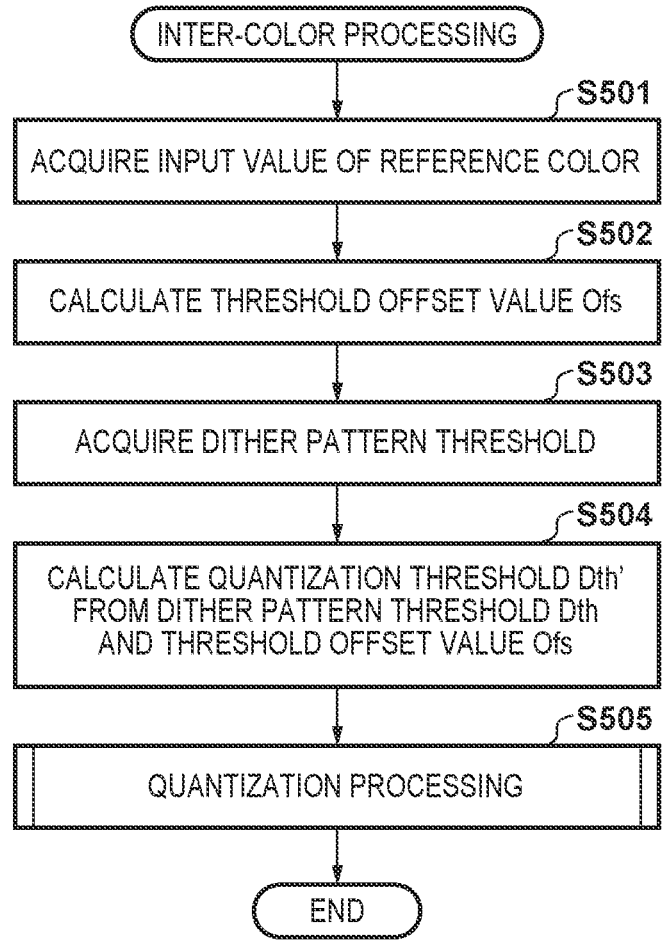

FIG. 6 is a diagram illustrating an example of multinary color data. Here, the multinary color data when the number of inks is four types, CMYK, is indicated. There are four types of primary color (C, M, Y, K) combinations and six types of secondary color (CM, CY, CK, MY, MK, YK) combinations. There are four types of tertiary color (CMY, CMK, CYK, MYK) combinations and one type of quaternary color (CMYK) combination. Note that the nullary color is paper white with no ink applied and is denoted as W.

When performing processing of quantizing multinary color data to, for example, two values, conversion to 1-bit data indicating printing (1) and no printing (0) is performed. Details of the quantization processing will be described later.

In step S304 (multinary color integration processing), the CPU 211 integrates the quantized multinary color data and converts it into CMYK data. Details of the multinary color integration processing will be described later.

In step S305 (data output processing), the CPU 211 outputs dot data as two-valued data to the RAM 212. As described above, the dot data (print data) stored in the RAM 212 is read by the head controller 215 and supplied to the respective rows of nozzles of the printheads 101 to 104. Thus, the ink ejection operation by the printheads 101 to 104 is performed, and a color image in which CMYK inks are superimposed is formed on the printing medium.

<Details of Quantization Processing>

Figure 4:
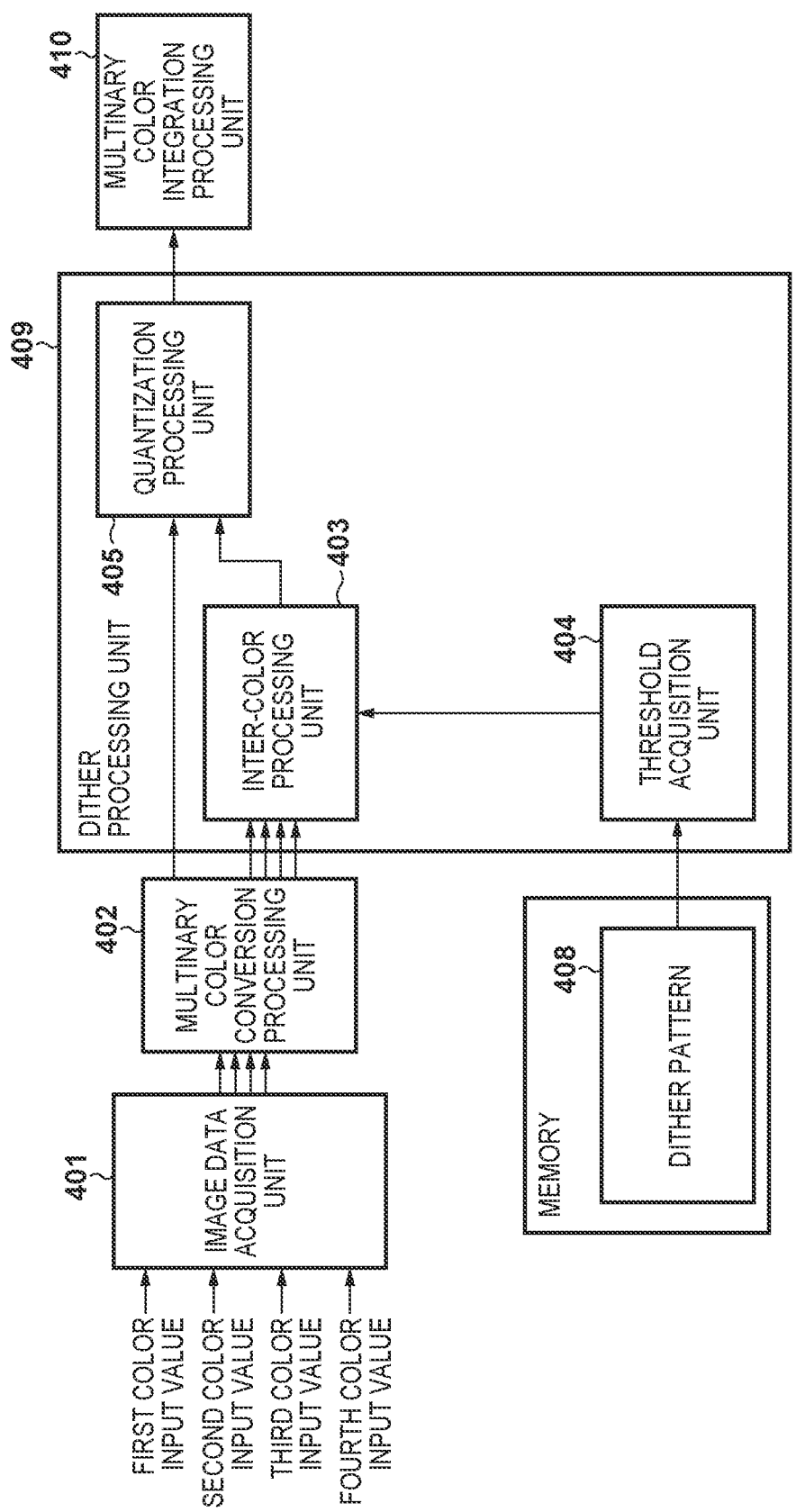
FIG. 4 is a diagram illustrating a flow of data in quantization processing.

FIG. 4 is a diagram illustrating a flow of data in the quantization processing (step S303). In the quantization processing, first, processing related to an input value is performed, then processing related to a threshold is performed, and finally, quantization processing according to the dither method is performed. A series of these processes are performed for each color (for each channel) in parallel processing. Hereinafter, each process will be described in detail with reference to FIG. 4.

An image data acquisition unit 401 acquires 16-bit density data indicating the density of each pixel. Here, it is assumed that the image data acquisition unit 401 can receive signals of up to 16 bits for eight colors. In FIG. 4, a state in which 16-bit data of each of the first to fourth colors (C, M, Y, K) is inputted is illustrated.

The multinary color conversion processing unit 402 converts data corresponding to each ink color to multinary color data. Multinary color data is data of a total of 16 types (16 colors) from the nullary color to the quaternary colors shown in FIG. 6. Details of the multinary color conversion processing unit 402 will be described later. The multinary color data is inputted to a dither processing unit 409.

The dither processing unit 409 directly transmits the multinary color data (processing target data) to be quantized to a quantization processing unit 405. Meanwhile, the multinary color data of colors other than the processing target data is inputted to an inter-color processing unit 403 as reference data.

The inter-color processing unit 403 performs predetermined processing on a threshold acquired by a threshold acquisition unit 404 to be described later based on the reference data, determines a final threshold, and then transmits the determined final threshold to the quantization processing unit 405.

The quantization processing unit 405 determines printing "1" or to no printing "0" by comparing the processing target data with the threshold inputted from the inter-color processing unit 403.

The threshold acquisition unit 404 selects one corresponding threshold matrix from a plurality of dither patterns 408 stored in a memory such as a ROM and acquires a threshold corresponding to a pixel position of the processing target data. In the present embodiment, the dither patterns 408 are threshold matrices formed by arranging thresholds of 0 to 65534 so as to have blue noise characteristics. The dither patterns 408 can exhibit a variety of sizes and shapes, for example, 512×512 pixels, 256×256 pixels, 512×256 pixels, and the like. That is, a plurality of threshold matrices having different sizes and shapes are stored in the memory in advance, and from these, the threshold acquisition unit 404 selects a given threshold matrix corresponding to the printing mode. Then, among the plurality of thresholds arranged in the selected threshold matrix, a threshold corresponding to a pixel position (x, y) of the processing target data is provided to the inter-color processing unit 403.

<Details of Multinary Color Conversion Processing Unit>

Figure 8:
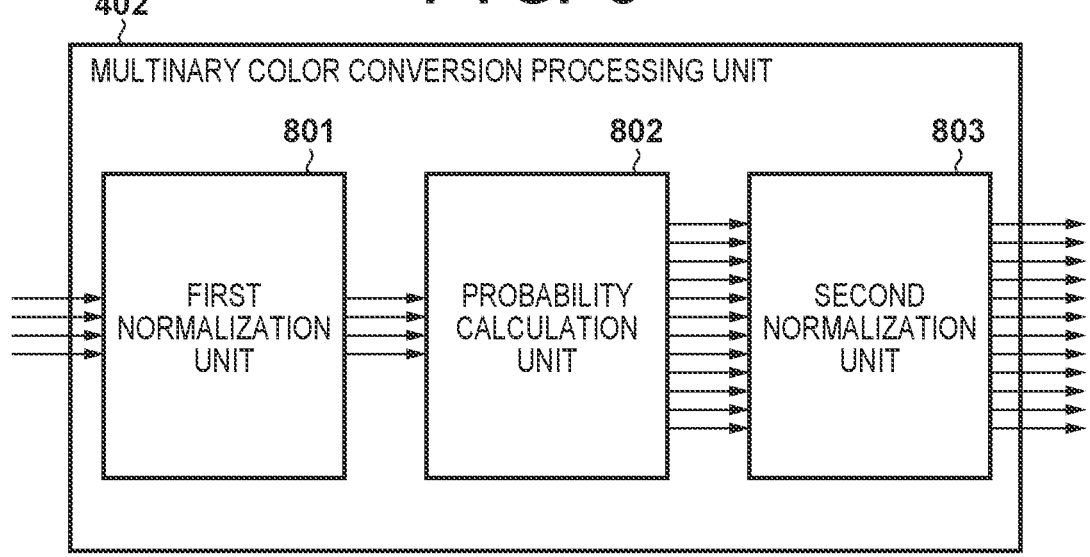
FIG. 8 is a block diagram illustrating a configuration of a multinary color conversion processing unit.

FIG. 8 is a block diagram illustrating a configuration of the multinary color conversion processing unit 402. First, a first normalization unit 801 normalizes the 16-bit density data acquired from the image data acquisition unit 401 to values of 0 to 1. Specifically, it is divided by 65535, which is the maximum value of a 16-bit value. Hereinafter, normalized data is denoted as c, m, y, and k. Next, a probability calculation unit 802 calculates the generative probability of multinary color data from the normalized data. The following Equation (1) is used for the calculation.

$$I_i = c' \times m' \times y' \times k' \tag{1}$$

Here, i=1 to 16, and $I_i$ is the generative probability (occurrence probability) of multinary colors of 16 types illustrated in FIG. 6. In addition, c' is a variable that becomes c when Ii is a multinary color including C ink and becomes (1−c) when C ink is not included. Similarly, m', y', and k' are variables that respectively are m, y, and k when $I_i$ is a multinary color including M ink, Y ink, and K ink and respectively are (1−m), (1−y), and (1−k) when M ink, Y ink, and K ink are not included. That is, Equation (1) is equivalent to Equations (1-1) to (1-16) below.

$$W: I_1=(1-c)(1-m)(1-y)(1-k) \quad (1\text{-}1)$$

$$C: I_2=c(1-m)(1-y)(1-k) \quad (1\text{-}2)$$

$$M: I_3=(1-c)m(1-y)(1-k) \quad (1\text{-}3)$$

$$Y: I_4=(1-c)(1-m)y(1-k) \quad (1\text{-}4)$$

$$K: I_5=(1-c)(1-m)(1-y)k \quad (1\text{-}5)$$

$$CM: I_6=cm(1-y)(1-k) \quad (1\text{-}6)$$

$$CY: I_7=c(1-m)y(1-k) \quad (1\text{-}7)$$

$$MY: I_8=(1-c)my(1-k) \quad (1\text{-}8)$$

$$CK: I_9=c(1-m)(1-y)k \quad (1\text{-}9)$$

$$MK: I_{10}=(1-c)m(1-y)k \quad (1\text{-}10)$$

$$YK: I_{11}=(1-c)(1-m)yk \quad (1\text{-}11)$$

$$CMY: I_{12}=cmy(1-k) \quad (1\text{-}12)$$

$$CMK: I_{13}=cm(1-y)k \quad (1\text{-}13)$$

$$CYK: I_{14}=c(1-m)yk \quad (1\text{-}14)$$

$$MYK: I_{15}=(1-c)myk \quad (1\text{-}15)$$

$$CMYK: I_{16}=cmyk \quad (1\text{-}16)$$

Note that the calculation of $I_1$ is unnecessary in an actual process but is described to clarify that the sum of $I_1$ to $I_{16}$ is 1.

Next, a second normalization unit 803 normalizes the generative probabilities of the multinary colors $I_1$ to $I_{16}$ to a 16-bit halftone. Specifically, it is multiplied by 65535, which is the maximum value of a 16-bit value.

The multinary color conversion processing is thus ended, and the multinary color conversion processing unit 402 transmits the multinary color data to the quantization processing unit 405 and the inter-color processing unit 403.

<Details of Inter-Color Processing>

FIG. 5A is a block diagram illustrating a configuration of the inter-color processing unit 403. In addition, FIG. 5B is a flowchart of the inter-color processing. As described above, the inter-color processing is processing included in the quantization processing (S303).

The inter-color processing unit 403 uses multinary color data other than multinary color data to be processed as reference data, performs predetermined processing on a threshold acquired by the threshold acquisition unit 404 using the reference data, and calculates a threshold for quantizing processing target data. Hereinafter, in order to simplify the description, description will be given using an example in which multinary color data of five colors, In_1 to In_5, are acquired from the multinary color conversion processing unit 402.

In FIG. 5A, the i-th (i=1 to 5) processing target data among the five colors is indicated as In_i(x, y). Here, (x, y) is a pixel position and serves as a coordinate parameter for the threshold acquisition unit 404 to select a threshold corresponding to a pixel position of the processing target data from the threshold matrix. Note that in order to simplify the description, notation may be made in the following with (x, y) omitted.

Further, in FIG. 5A, the reference data when processing the i-th color is indicated as In_j(x, y). Here, j is an integer between 1 and i−1. For example, when processing the third multinary color data, In_3; two pieces of data, In_1 and In_2, are reference data. Incidentally, In_1 to In_5 are set in the order in which they are visually conspicuous (the order of low brightness and the order of high density).

In step S501, the reference data In_j(x, y) is inputted to a threshold offset amount calculation unit 406 in the inter-color processing unit 403.

In step S502, the threshold offset amount calculation unit 406 calculates a threshold offset Ofs_i(x, y) for the processing target data In_i(x, y) using the inputted reference data. Here, the threshold offset value Ofs_i(x, y) is calculated by the following equation.

$$Ofs\_i(x,y)=\Sigma In\_j(x,y) \quad (2)$$

Here, $\Sigma$ represents a summation of variables from 1 to j. Equation (2) is equivalent to Equations (2-1) to (2-5) below.

$$Ofs\_1(x,y)=0 \quad (2\text{-}1)$$

$$Ofs\_2(x,y)=In\_1(x,y) \quad (2\text{-}2)$$

$$Ofs\_3(x,y)=In\_1(x,y)+In\_2(x,y) \quad (2\text{-}3)$$

$$Ofs\_4(x,y)=In\_1(x,y)+In\_2(x,y)+In\_3(x,y) \quad (2\text{-}4)$$

$$Ofs\_5(x,y)=In\_1(x,y)+In\_2(x,y)+In\_3(x,y)+In4(x,y) \quad (2\text{-}5)$$

The calculated threshold offset value Ofs_i(x, y) is outputted to a threshold offset amount subtraction unit 407.

In step S503, the threshold offset amount subtraction unit 407 acquires a threshold Dth corresponding to the coordinates (x, y) of the processing target data In_i(x, y) from the threshold acquisition unit 404.

In step S504, the threshold offset amount subtraction unit 407 subtracts the threshold offset value Ofs_i(x, y) inputted from the threshold offset amount calculation unit 406 from the threshold Dth(x, y) acquired from the threshold acquisition unit 404 to obtain a quantization threshold Dth_i(x, y). The obtained quantization threshold Dth_i(x, y) is outputted to the quantization processing unit 405.

$$Dth\_i(x,y)=Dth(x,y)-Ofs\_i(x,y) \quad (3)$$

In this case, if Dth_i(x, y) is negative, the quantization threshold Dth_i(x, y) is obtained by adding Dth_max+1. Dth_max is the maximum value of the thresholds that the dither matrix holds. Thus, the quantization threshold Dth_i will always take on a value between 0 and Dth_max. That is, when Dth_i(x, y)<0, $$Dth\_i(x,y)=Dth\_i(x,y)+(Dth\_\max+1) \quad (4)$$

In step S505, the quantization processing unit 405 compares the processing target data In_i(x, y) with the quantization threshold Dth_i(x, y) and determines whether to perform printing (1) or no printing (0) of dots for the pixel position (x, y).

Figure 7:
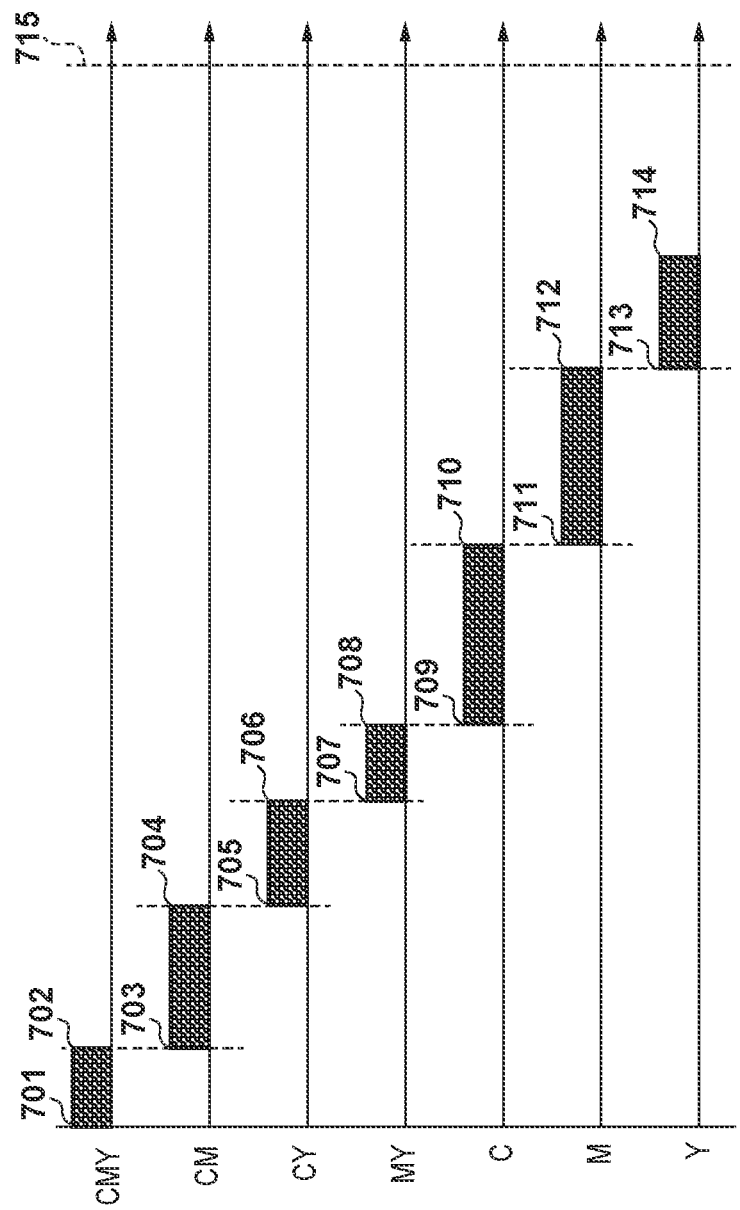
FIG. 7 is a diagram for explaining threshold ranges.

FIG. 7 is a diagram for explaining threshold ranges. Here, a threshold range refers to a range of a threshold (value before subtraction of an offset amount) determined as printing "1" among a plurality of thresholds (0 to Dth_max) arranged in a threshold matrix. The horizontal axis represents the threshold Dth, and a value 715 represents the position of Dth_max. Threshold ranges of the first to seventh colors (CMY, CM, CY, MY, C, M, Y) are illustrated in order from the top of FIG. 7.

In this example, for the first color, Ofs_1=0 from Equation (2-1). Therefore, the positions of pixels corresponding to the threshold, 0 to In_1-1 (value 701 to value 702) are set to printing "1". Similarly, for the second color, Ofs_2=In_1 from Equation (2-2). Therefore, In_1 to In_1+In_2-1 (value 703 to value 704) are set to printing "1". Similarly below, the printing positions up to the seventh color are set.

As described above, in the inter-color processing, while using a common threshold matrix, the quantization threshold Dth_i unique to each color is obtained by setting one another's input values as offset values. Then, by using the newly obtained quantization threshold Dth_i in the quantization processing, it is possible to place the dots so that the dot print pattern will have blue noise characteristics even when a plurality of colors are interspersed.

<Details of Multinary Color Integration Processing Unit>

A multinary color integration processing unit 410 integrates the quantized multinary color data into data for each ink. For example, the quantized data of the secondary color CM, which is a superimposed dot of C and M, is added to the quantized data of C and the quantized data of M, respectively.

<Effect of First Embodiment>

FIG. 9 is a diagram illustrating an example of a result of inter-color processing in a conventional technique. Specifically, an example in which the 16-bit density data of each of CMYK colors is C, M, Y, K=30840, 28270, 20560, and 0 is illustrated.

A row 901 indicates the number of multinary color dots formed on a printing medium when there is no relative positional shift between the color materials. Multinary color dots include single dots printed with a single color material at the same position and multiplex dots printed with a plurality of color materials at the same position. Since the dots of each ink are exclusively arranged in the conventional inter-color processing, the W pixels (without dots) are 0.

Meanwhile, a row 902 indicates the number of multinary color dots formed on a printing medium when there is relative positional shift between the color materials. Due to the positional shift, the number of W pixels (no dots) is increased to 10768. In addition, the number of most multinary color dots varies greatly depending on the presence or absence of positional shift. For this reason, in the conventional inter-color processing, color fluctuation occurs due to positional shift.

FIG. 10 is a diagram illustrating an example of a result of inter-color processing in the first embodiment. Similarly to the case of FIG. 9, an example in which the 16-bit density data of each of CMYK colors is C, M, Y, K=30840, 28270, 20560, and 0 is illustrated. A row 1001 indicates the number of multinary color dots formed on a printing medium when there is no positional shift. Meanwhile, a row 1002 indicates the number of multinary color dots formed on a printing medium when there is a positional shift.

In the inter-color processing according to the first embodiment, it is understood that the change in the number of multinary color dots due to the presence or absence of positional shift is suppressed as compared with the conventional technique (FIG. 9). Therefore, even when positional shift occurs, color fluctuation can be suppressed.

Further, since color fluctuation is suppressed regardless of the size of the positional shift, it is possible to suppress color unevenness regardless of the phase of the meandering of paper conveyance. That is, it is also effective against color unevenness caused by sheet meandering, which occurs in a printer having printheads as illustrated in FIG. 1B.

Furthermore, as described above, in the quantization processing of the first embodiment, dots are arranged such that the arrangement of the multinary color data has blue noise characteristics. Therefore, graininess can also be improved compared with the (uncorrelated) normal dither processing in which the inter-color processing is not performed.

As described above, according to the first embodiment, CMYK data (density data) is converted into multinary color data and then quantization processing is performed. In particular, control is performed so that the printed dots are arranged with high dispersion in the order of low brightness (order of high density) of the superimposed dots. This makes it possible to suppress a change in dot overlap due to positional shift and can improve graininess while suppressing color fluctuation in a printed image.

Second Embodiment

In the first embodiment, an example in which color fluctuation is suppressed by suppressing a change in the number of multinary color dots due to the presence or absence of positional shift has been described. However, a positional shift does not always occur. For example, printing conditions may differ depending on the type of printing medium, the conveyance speed, and the like.

Therefore, in the second embodiment, an example in which the positional shift amount is acquired as information and the inter-color processing is changed based on the acquired determination result of the positional shift amount will be described. Note that since the apparatus configuration, system configuration, and operation are substantially the same as those of the first embodiment, the following description focuses on portions different from those of the first embodiment.

<Quantization Processing>

FIG. 11 is a diagram showing a flow of data in quantization processing according to the second embodiment. The difference from the first embodiment (FIG. 4) is that a positional shift acquisition unit 411 has been added and positional shift amount information will be provided to the multinary color conversion processing unit 402. Accordingly, positional shift acquisition processing and multinary color conversion processing will be described below.

<Positional Shift Acquisition Processing>

FIG. 12 is a flowchart illustrating processing of acquiring a positional shift.

Figure 13B:
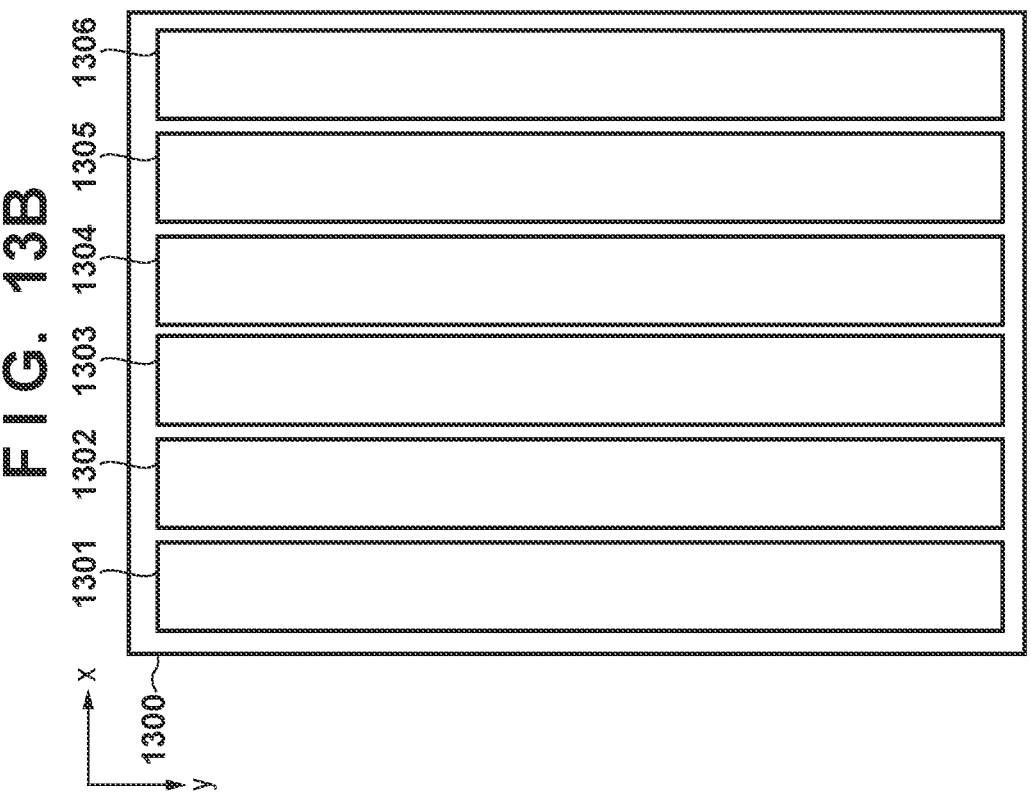
FIGS. 13A and 13B are diagrams illustrating examples of charts for acquiring a positional shift.
Figure 13A:
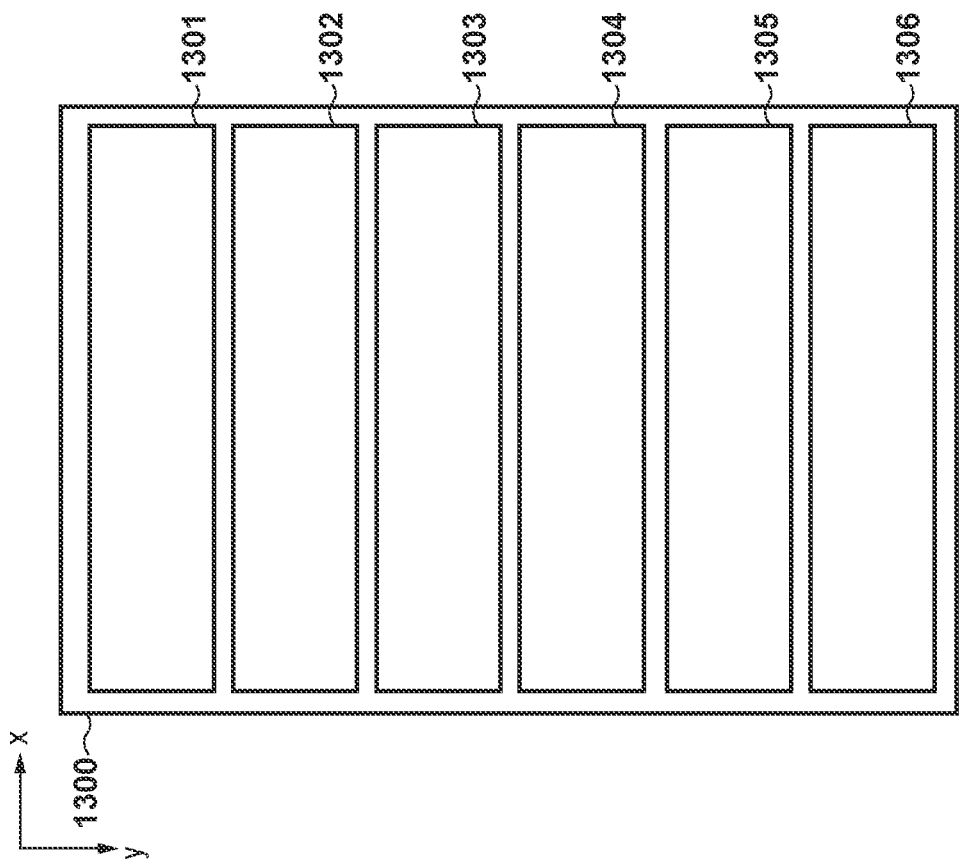

In step S1200, the printer 100 acquires chart image data for acquiring a positional shift. FIG. 13A is a diagram illustrating an example of a chart for acquiring a positional shift. Charts 1300 are CMYK data (16 bits for each color). Each of the regions 1301 to 1306 is a patch of uniform halftone, and each is configured by color data corresponding to secondary colors of six types (CM, CY, CK, MY, MK, YK). The data corresponding to each ink is 32767 (50% density of the 16-bit maximum value), respectively. In other words, any secondary color is data in which the sum is 65534. Note that the layout of the positional shift acquisition charts 1300 is optional, and patches may be such that the longer direction of each region is aligned to the y-direction as in FIG. 13B.

In step S1201, the printer 100 prints positional shift acquisition charts. As described above, since the positional shift acquisition charts are CMYK data, the processing starts from the quantization processing in step S303 in the image processing flow illustrated in FIG. 3. Here, one chart is printed for each of the case of performing the multinary color conversion processing and the case of not performing the multinary color conversion processing.

Note that in the processing flow in which the multinary color conversion is not performed, the processing by the multinary color conversion processing unit 402 is skipped, and CMYK data is transmitted to the quantization processing unit 405 and the inter-color processing unit 403. Alternatively, the quantization processing may be performed using the following equations (5-1) to (5-4) in place of the equations (1-2) to (1-5) in the multinary color conversion processing unit 402, and setting the multinary color data other than these to 0.

$$C: I_2 = c \tag{5-1}$$

$$M: I_3 = m \tag{5-2}$$

$$Y: I_4 = y \tag{5-3}$$

$$K: I_5 = k \tag{5-4}$$

In step S1202, the positional shift acquisition unit 411 scans each of the two printed charts with the scanner 107. The scanned image is RGB image data. In step S1203, the positional shift acquisition unit 411 calculates the color differences between the two scanned RGB images (i.e., the color differences in the generated colors). As for the color differences, the average RGB of the patches of six types may be compared with each other, and the sum of the squared difference of each of R, G, B channels may be used. In step S1204, the positional shift acquisition unit 411 determines the presence or absence of positional shift. Here, when any of the above color differences is equal to or larger than a predetermined value T, it is determined that there is a positional shift.

<Multinary Color Conversion Processing>

The multinary color conversion processing unit 402 changes the multinary color conversion processing according to the information of the presence or absence of positional shift acquired from the positional shift acquisition unit 411. More specifically, when the determination result is "there is a positional shift", the multinary color conversion using Equation (1) is performed in the same manner as in the first embodiment. Meanwhile, in the case of "there is no positional shift", Equations (5-1) to (5-4) are used. That is, the multinary color conversion processing is skipped.

<Effect of Second Embodiment>

As described above, according to the second embodiment, the necessity of the multinary color processing described in the first embodiment is determined in accordance with the presence or absence of positional shift. This makes it possible to appropriately suppress a change in dot overlap due to positional shift and can improve graininess while suppressing color fluctuation in a printed image.

(Variations)

In the second embodiment, an example in which the positional shift amount is acquired using the scanner 107 and the positional shift acquisition charts 1300 has been described, but the method of acquiring positional shift is not limited to this. For example, a sensor for detecting the conveyance speed of the printing medium may be provided to determine the positional shift amount from a speed change. In addition, a mode may be such that a table in which the positional shift determination result is held for each type of printing medium or conveyance speed is provided and referred to.

In the first and second embodiments, an example in which the generative probability as shown in Equation (1) is used as the multinary color conversion processing in the multinary color conversion processing unit 402 has been described. However, the multinary color conversion processing is not limited to this. For example, the amount of multinary color data to be generated may be calculated by counting the number of multinary color dots to be generated upon first performing quantization according to the conventional inter-color processing and then applying a relative shift in the position of quantized C, M, Y, K data that was generated. Similarly, calculation may be performed by counting the number of multinary color dots from a result first quantized using uncorrelated threshold matrices of four types without performing the inter-color processing.

In addition, in the above embodiments, an example in which inks of 4 colors of C, M, Y, K is used has been described. However, the type and number of inks are not limited thereto. For example, a light-color ink having high brightness such as gray (Gr), light cyan (Lc), or light magenta (Lm) may be used. In addition, a special color ink such as red (R), green (G), or blue (B) can be used in combination.

Further, in the above embodiments, an example in which the inter-color processing is performed by subtracting an offset amount from a threshold has been described, but the method of inter-color processing is not limited to this. For example, the two inter-color processing described below result in the same result. Processing 1 is processing described in the first embodiment. Processing 2 is that in which a quantization result of the first color is subtracted after quantizing by adding an offset to the input value.

(Processing 1)
Dth_2(x, y)=Dth(x, y)-Ofs_2(x, y)
if In_2>Dth_2(x, y):
   Out_2=1
else:
   Out_2=0
(Processing 2)
In_2(x, y)=In_2(x, y)+Ofs_2(x, y)
if In_2>Dth(x, y):
   Out_2=1
else:
   Out_2=0
Out_2=Out_2-Out_1

Although there is a disadvantage that processing cannot be performed in parallel since the processing 2 refers to the output result (Out 1) of other colors, an equivalent result can be obtained in any process.

In addition, although an example in which dither processing using a threshold matrix is used as the quantization processing has been described in the above embodiments, the method of quantization processing is not limited to this. For example, in the known error diffusion method, in a pixel in which the quantization result of the first color is printing "1", it is possible to realize equivalent inter-color processing by adding an offset to a threshold of the second color. However, because the output result of other colors (Out 1) is referenced, processing cannot be performed in parallel.

In the above embodiments, description has been given with an inkjet printer as the image processing apparatus, but only the host PC 200 may be used as the image processing apparatus. In this case, in the image processing illustrated in the flowchart of FIG. 3, for example, the host PC 200 performs all of the process of steps S300 to S305, and the printer 100 only forms a color image based on the dot data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-203653, filed Dec. 8, 2020 which is hereby incorporated by reference herein in its entirety.

What is claimed is:

1. An image processing apparatus operable to generate data for printing an image onto a printing medium using a plurality of color materials, the image processing apparatus comprising:
   a color separation unit configured to generate a plurality of color image data corresponding to the plurality of color materials based on image data;
   a generation unit configured to generate multinary color data corresponding to a combination of the plurality of color materials based on the plurality of color image data; and
   a quantization unit configured to generate quantized data corresponding to each of the plurality of color materials based on the multinary color data and a threshold matrix,
   wherein the generation unit calculates a generative probability of respective multinary colors based on the plurality of color image data generated based on the image data, and
   the quantization unit corrects a quantization threshold based on the calculated generative probability of respective multinary colors and generates the quantized data.

2. An image processing apparatus operable to generate data for printing an image onto a printing medium using a plurality of color materials, the image processing apparatus comprising:
   a color separation unit configured to generate a plurality of color image data corresponding to the plurality of color materials based on image data;
   a generation unit configured to generate multinary color data corresponding to a combination of the plurality of color materials based on the plurality of color image data; and
   a quantization unit configured to generate quantized data corresponding to each of the plurality of color materials based on the multinary color data and a threshold matrix,
   wherein the quantization unit calculates a generative probability of respective multinary colors by counting a number of respective multinary colors to be generated based on a plurality of quantized data obtained by quantizing the plurality of color image data generated based on the image data using threshold matrices, corrects a quantization threshold based on the calculated generative probability of respective multinary colors, and generates the quantized data.

3. The image processing apparatus according to claim 1, wherein the quantization unit generates quantized data in which a printed dot corresponding to the multinary color data is exclusively arranged on the printing medium.

4. The image processing apparatus according to claim 1, wherein the quantization unit generates quantized data in which a printed dot corresponding to the multinary color data is arranged such that the higher the density of a multinary color dot, the higher the dispersal.

5. The image processing apparatus according to claim 1, wherein the quantization unit generates first quantized data for respective multinary colors based on the multinary color data and the threshold matrix and generates second quantized data for respective colors of the plurality of color materials based on the first quantized data.

6. A control method of an image processing apparatus operable to generate data for printing an image onto a printing medium using a plurality of color materials, the control method comprising:
   performing color separation to generate a plurality of color image data corresponding to the plurality of color materials based on image data;
   generating multinary color data corresponding to a combination of the plurality of color materials based on the plurality of color image data; and
   quantizing each of the plurality of color materials based on the multinary color data and a threshold matrix to generate quantized data,
   wherein, in the generating, a generative probability of respective multinary colors is calculated based on the plurality of color image data generated based on the image data, and
   in the quantizing, a quantization threshold is corrected based on the calculated generative probability of respective multinary colors and the quantized data is generated.

7. A non-transitory computer-readable recording medium storing a program for causing a computer to execute a control method of an image processing apparatus operable to generate data for printing an image onto a printing medium using a plurality of color materials, the control method comprising:
   performing color separation to generate a plurality of color image data corresponding to the plurality of color materials based on image data;
   generating multinary color data corresponding to a combination of the plurality of color materials based on the plurality of color image data; and quantizing each of the plurality of color materials based on the multinary color data and a threshold matrix to generate quantized data, wherein, in the generating, a generative probability of respective multinary colors is calculated based on the plurality of color image data generated based on the image data, and in the quantizing, a quantization threshold is corrected based on the calculated generative probability of respective multinary colors and the quantized data is generated.

* * * * *